United States Patent

Neühauser et al.

[15] 3,673,919
[45] July 4, 1972

[54] APPARATUS FOR HELICALLY MACHINING A BLANK OF VARYING DIAMETER

[72] Inventors: Hans Neühauser; Helmut Benz, both of Enzberg, Wurttemberg; Werner Gukelberger, Prum/Eifel, all of Germany

[73] Assignee: Gustav Neuhauser Praezisionswerkzeug-Fabrik o.h.G., Enzberg/Wurttemberg, Germany

[22] Filed: Dec. 2, 1969

[21] Appl. No.: 886,609

[30] Foreign Application Priority Data

Dec. 3, 1968 Germany..................P 18 12 288.8

[52] U.S. Cl.................................................90/11.62, 82/5
[51] Int. Cl..............................................................B23c 3/32
[58] Field of Search..................90/11.54, 11.62, 11.5, 11.52, 90/11.64; 82/5

[56] References Cited

UNITED STATES PATENTS

| 2,871,765 | 2/1959 | Saari | 90/11.64 |
| 3,156,154 | 11/1964 | Stanaback | 90/11.62 |

FOREIGN PATENTS OR APPLICATIONS

| 229,668 | 2/1944 | Switzerland | 90/11.62 |

*Primary Examiner*—Gil Weidenfeld
*Attorney*—Michael S. Striker

[57] ABSTRACT

A conical blank is rotated and simultaneously advanced so that a milling cutter cuts a helical groove into the same. In order to obtain a constant helix angle and a constant peripheral speed of the successively cut blank portions of different diameter, the rotary speed of the blank is cyclically varied by a control device including a cam and a cam follower influencing a differential transmission which connects drive means with the rotary blank.

9 Claims, 2 Drawing Figures

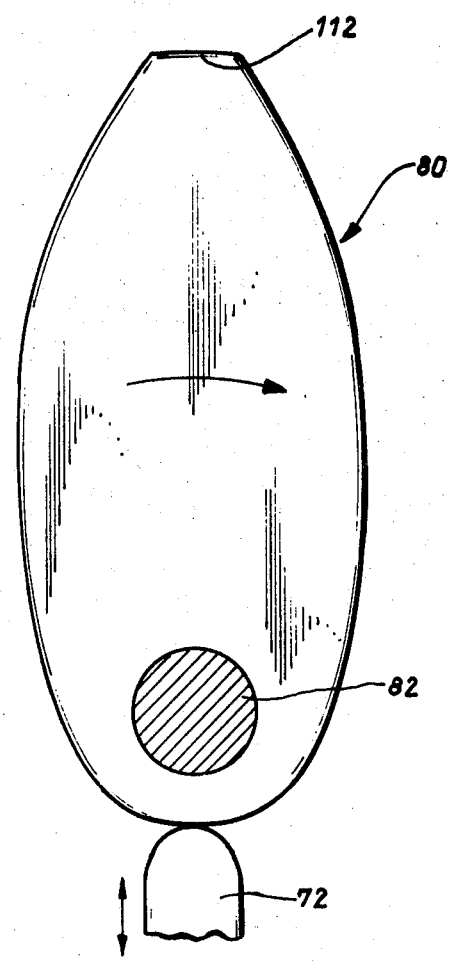

APPARATUS FOR HELICALLY MACHINING A BLANK OF VARYING DIAMETER

BACKGROUND OF THE INVENTION

Machine tools are well known by which grooves, edges, or teeth are machined into a conical blank along a helical path. The required rotary motion of the blank is derived from the advancing movement of the carriage supporting the blank and transmitted to the drive shaft, which rotates the tool holder by a suitable transmission. An indexing head is provided for performing indexing operations while the carriage is stopped.

In order to helically machine a cylindrical blank, it is necessary to rotate the blank at a rotary speed which is in predetermined relationship with the axial advance movement of the blank, and the desired gradient or pitch of the helical cut. The indexing drive of the blank is obtained from the advancing movement of the longitudinal carriage of the blank by a transmission.

If in the same manner, a helical cut or groove is to be made in a conical or frustoconical blank, the result is unsatisfactory. Due to the conical shape of the blank whose diameter varies along the axial length thereof, the peripheral speed of the blank continuously changes while the blank is rotated at the same rotary speed. Assuming the same feeding movement of the tool, such as a milling cutter, the helix angle of the edges is continuously varied which causes an unsatisfactory cutting action. Due to the variation of the diameter of the conical blank, the cut helical groove has a high gradient and pitch in the region of the small diameters of the blank, which is continuously reduced as the cutting tool moves toward the portions of greater diameter of the blank. This has the disadvantage that the clearance angle and rack angle are different for different portions of the blank, and cannot be exactly determined. The worst cutting conditions are present in the region where the blank has the smallest diameter. Assuming that the blank is used for making a milling cutter, the finished cutter will be subjected to the greatest stress at its thin end where the most unprecise cutting has occurred.

Apparatus is known by which a template controls a valve which varies the speed of a motor driving the drive shaft of the machine. The valve of the apparatus causes disturbances, and the apparatus is not suitable for all machine tools.

SUMMARY OF THE INVENTION

It is one object of the invention to provide a machine tool capable of machining a blank of varying diameter, particularly a conical blank, along a helical path of uniform pitch.

Another object of the invention is to machine a blank of varying diameter along a helical path while the peripheral speed of the rotating blank is maintained constant.

Another object of the invention is to mill a helical cut into a conical blank in such a manner that all portions of the blank successively engaged by the cutter, move at the same peripheral speed.

Another object of the invention is to rotate a blank having portions of different diameter at different rotary speeds related to the diameter of the blank portion which is being cut.

With these objects in view, a drive means of the blank supporting carriage drives an epicyclic transmission by which the blank is rotated. A control device is also connected with the epicyclic transmission and varies the speed of the output of the same, and thereby the rotary speed of the blank depending on the continuously varying relative position between the cutter and the blank in such a manner that the peripheral speed remains the same irrespective of the different diameters of the blank.

One embodiment of the invention comprises first and second supports for supporting the tool and the blank, respectively a drive shaft on the second support for rotating the blank about an axis; drive means for moving one of the first and second supports in axial direction relative to the respective other support whereby the relative position of the tool and blank continuously varies and the tool engages successive blank portions having different diameters; an epicyclic transmission including a first input member driven by the drive means, an output member connected with the drive shaft, and a second input member; and a control device having an output means connected with the second input member, and including control means driven from the drive means and varying the speed of said output means of the control device so that the speed of the second input member and of the output member are varied in accordance with the continuous variation of the relative position of the blank and the tool in such a manner that substantially the same peripheral speed of blank portions of different diameter engaged by the tool is obtained.

Different types of epicyclic transmissions and of control devices can be used, but in any event, the combination of these devices permits an adjustment of the peripheral speed of the blank depending on the relative position between the blank and the tool in such a manner that the gradient and pitch of the helical cut in the conical blank remains the same along the entire length of the blank.

The epicyclic transmission is preferably a differential gear transmission having a planetary carrier with a gear driven from the drive means by which the support of the blank is moved in axial direction of the same. The epicyclic transmission has an output sun gear connected with the drive shaft of the blank, and a second sun gear driven from the control device.

Another advantageous construction of the epicyclic transmission is a planetary transmission having a hollow gear and a sun gear driven from the drive shaft of the blank supporting carriage, and having at least one planetary gear for driving the drive shaft by which the blank is rotated. The hollow gear is controlled and operated at the varying speed by the control device.

It is most advantageous to use a mechanical control device driven from the drive means of the machine, so that it is not necessary to provide an additional source of power.

In the preferred embodiment of the invention, the control device includes a cam rotated from the drive means of the machine at a constant speed, and cooperating with the cam follower portion of a rack bar driving a pinion operatively connected with the epicyclic transmission. It is not necessary to use different cams for different blanks, if a change speed transmission is provided between the epicyclic transmission and the output means of the control device.

The shape of the cam track of the cam can be designed in such a manner that, assuming the use of suitable change gears, blanks of different length and different cone angles can be machined. In the preferred preferred embodiment of the invention, the cam has an elongated oval cam track, and an axis of rotation located in the longitudinal plane of symmetry of the cam near one end of the cam track. In order to carry out the indexing movement of the blank after completion of the milling or grinding operation, the blank support, the tool support, is rapidly returned to its initial position, and for this purpose, the direction of rotation of the drive means is reversed. This rapid return movement is also carried out by the cam which may produce an impact on the cam follower portion of the rack bar controlled by the same due to its elongated shape. In order to prevent such an occurrence, the rack bar of the control device, is rapidly moved away from the cam by a hydraulic motor before the cam has been turned in opposite direction to its initial position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a side view of a cam used in the apparatus shown in FIG. 1.

DESCRIPTION OF THE PREFERRED EMBODIMENTS

Figure 1:
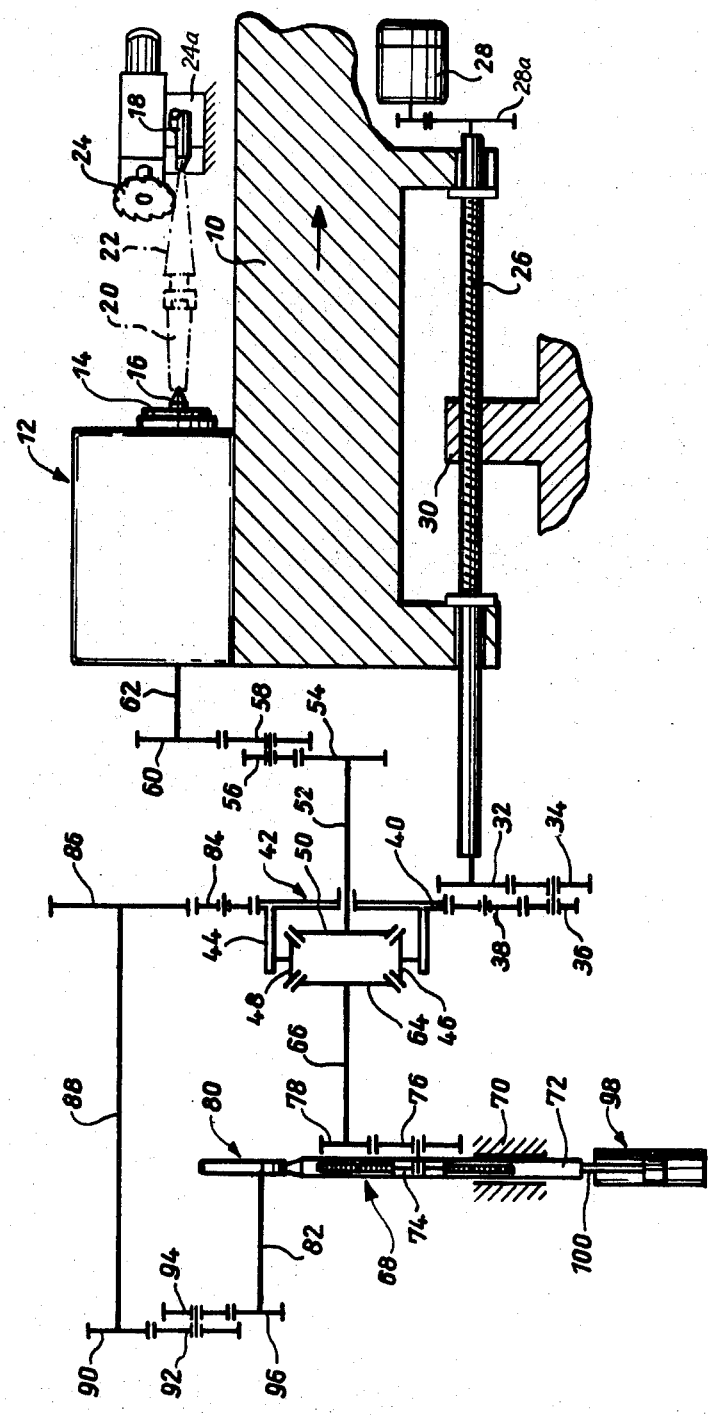
FIG. 1 is a fragmentary schematic view, partially in section, illustrating a preferred embodiment of the invention.

A stationary support 24a, schematically shown in FIG. 1, supports the milling cutter 24 for rotation in a plane slanted a predetermined angle to the axis of a workpiece 20 which includes a conical blank 22 which is to be provided with a helical groove by the milling cutter 24. The workpiece 20 is mounted between centers 16 and 18, center 16 being driven through the indexing head 12 by a drive shaft 62. The indexing head, and centers 16 and 18 with workpiece 20, are carried by a longitudinally movable carriage 10 having projections in which a screw spindle 26 is mounted for rotation, but nonmovable in axial direction relative to carriage 10. Spindle 26 engages an inner thread in a stationary member 30 so that support 10,12,16,18 is moved in the direction of the arrow when spindle 26 is rotated by gears 28a connecting a motor 28 with spindle 26. The free end of spindle 26 drives a gear 32 which is part of a change gear transmission including gears 34,36 and 38.

The carrier 44 of a differential planetary transmission 42 has an outer gear 40 meshing with gear 38. Planetary gears 46 and 48 are mounted on planetary carrier 44, and mesh with an output sun gear 50 connected with a shaft 52, and an input sun gear 64 connected with a shaft 66. The output member 50,52 drives a gear 54 of a change speed gear transmission including gears 56,58, and 60 which drives drive shaft 62 by which workpiece 20 with bank portion 22 is rotated.

The input sun gear 64 is connected with a shaft 66 carrying a gear 78 of a change gear transmission including a gear 76 and a pinion 74 secured to gear 76 for rotation therewith. Pinion 74 is the output means of a control device 68 which includes a rack bar 72 mounted in a guide way 70 for longitudinal movement, and having at one end a cam follower portion cooperating with an oblong cam 80, best seen in FIG. 2.

Cam 80 has an elongated oval cam track symmetrical to the longitudinal plane of symmetry in which the axis of a shaft 82, to which cam 80 is fixed, is located. Shaft 82 is disposed near one end of the cam track which has a small radius of curvature, while the other end 112 is flattened.

At the remote end of rack bar 72, a piston 100 is provided which is guided in a cylinder 98 and can be operated to move the rack bar 72 rapidly away from cam 80. The hydraulic motor 98,100 may also be used for urging the rack bar against cam 80, or a spring, not shown, may be provided for this purpose.

Cam shaft 82 carries a fixed gear 96 which is part of a change gear transmission including gears 90,92,94. Gear 90 is fixed on a shaft 88 driven by a gear 86 which meshes with a pinion 84 meshing with the outer gear 40 of the planetary carrier 44 of the epicyclic transmission 42. Consequently, cam 80 is driven from the drive means 28,26,32,34,36,38 through gear 40, and gears 84,86,90,92,94,96, and shafts 88 and 82.

OPERATION

When motor 28 is started, the drive means 28, 30, 32, 34, 36, 38 drive gear 40 of the epicyclic transmission 42 so that the output member 50,52 is rotated by the planetary gears 46 and 48, and the rotary motion is transmitted by gears 54,56,58,60 to the drive shaft 62 which rotates the workpiece 20 with the blank portion 22. At the same time, spindle 26 causes movement of supporting carriage 10 in direction of the arrow relative to the stationary support 24a of the rotary milling cutter 24 so that the same cuts a helical groove into the conical blank portion. The milling cutter 24 is mounted on stationary support 24a in a position in which its axis defines such an angle with the axis of the blank 22 that no transverse movement of cutter 24 is required and the gradient of the cut groove is constant while the blank 22 moves relative to the cutter 24 with carriage 10 along a straight path.

Assuming that the control device 68 is disconnected, for example by a clutch, not shown, from the second input gear 64 of the epicyclic transmission 42, drive shaft 62 performs a rotary motion depending on the advance movement of support carriage 10 and the gradient and pitch of the helical groove which is to be cut. The linear movement of the support carriage 10 in the direction of the arrow, combined with the rotary movement of shafts 62 and 14, results in the cutting of a helix on the blank 22.

Since blank 22 is conical and has a diameter gradually increasing from the thin end to the thick end of blank 22, it is necessary to vary the angular speed of shafts 16,14, continuously in accordance with the relative movement between blank 22 and tool 24 in such a manner that the helix angle and gradient of the cut groove remains the same over the entire axial length of blank 22. This is accomplished by the control device 68. Cam 80 is driven from drive means 28,26, gear 40 of the epicyclic transmission, and other gears, 84,85,90,92,94,96, as described above, so that its constant rotary speed is related to the speed at which support carriage 10 advances workpiece 22 relative to milling cutter 24.

During rotation of cam 80, rack bar 72 is displaced at a varying speed, depending on the cam track portion engaged by the same at any moment during the rotation of cam 80. Longitudinal displacement of rack bar 72 causes rotation of pinion 74 which drives shaft 66 through gears 76 and 78 so that input gear 64 is rotated at varying speed and influences the speed of the output member 50,52 of the epicyclic transmission whereby the speed of drive shaft 62 and shaft 14 of the indexing head are varied accordingly. Consequently, the workpiece 20 with blank 22 does not rotate at a constant speed, but at a varying speed which depends on the shape of the cam track of cam 80. Cam 80 is designed so that each complete revolution corresponds to the movement of blank 22 relative to cutter 24 from a position in which the cutter engages the thin end, and a position in which the cutter engages the thick end of blank 22. The varying rotary movement produced by cam 80 and superimposed in the epicyclic transmission 42 on the uniform movement produced by the drive means, is so designed that during the milling operation, successive portions of the blank engaged by the cutter 24 move at the same peripheral speed so that the gradient of the cut helical grooves is the same over the entire length of the conical blank 22.

At the end of a cutting operation, when the thick end of blank 22 has been cut by the milling tool 24, support carriage 10 is rapidly moved to its initial position. Due to the fact that cam 80 is connected by a gear train with a drive means 28,26 of support carriage 10, rapid rotation of spindle 26 in the reversed direction of rotation causes also rapid reverse turning of cam 80 to an end position in which its flat end face 112 is located opposite the end of rack bar 72. In order to prevent an impact of the elongated cam on the rack bar 72, the servo motor 98 is operated directly before the reversal of the support carriage 10, and rack bar 72 with its cam follower end portion is rapidly moved away from cam 80 so that the same can turn to its initial position without touching the cam follower portion of rack bar 72. Directly before the next following milling operation, the rack bar 72 is again moved forward into engagement with a cam 80.

As best seen in FIG. 2, shaft 82 of cam 80 is provided near one end of the oval oblong peripheral cam track of cam 80. One end 112 of the cam, which is located opposite the cam follower end portion of rack bar 72 in the initial position of rest of the apparatus, is flat. The lateral cam track portions are symmetrically curved at a great angle of curvature. During one milling operation, while the blank 22 moves past the tool 24 from a position in which the thin end is engaged by the tool to a position in which the thick end is engaged by the tool, cam 80 turns an angle of 360°. The transmission ratio of the several change gear transmissions is selected so that the rounded end of the cam track cooperates with rack bar 72 when support carriage 10 has moved a distance corresponding to half the length of blank 22 so that tool 24 is located in the middle of blank 22 in the region of the median diameter of the blank, as illustrated in FIG. 1.

From this position on, control device 68 must influence the speed of rotation of output member 50,52 of the epicyclic transmission 42, of shafts 62,16 and of blank 22 in the reversed manner, which is obtained by the second half of the cam track of cam 80 which is operative during the second half of its revolution.

At the beginning of the milling operation, when the cutting tool 24 cooperates with the end portion of blank 22 which has the smallest diameter, the blank 22 must be rotated at a continuously increased rotary speed in order to cut a helical groove having the desired constant gradient. From the middle position of tool 24 on the blank 22, the workpiece 20,22 must be rotated at a continuously reduced rotary speed in order to assure that all parts of the conical blank 22 are cut at the same peripheral speed of the blank so that a constant gradient of the helical grooves cut by the tool 24 is obtained.

It will be understood that each of the elements described above, or two or more together, may also find a useful application in other types of apparatus for helically machining a blank of varying diameter differing from the types described above.

While the invention has been illustrated and described as embodied in an apparatus in which the rotary speed of a conical blank is varied during the cutting of the helical groove, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Apparatus for helically machining a blank of varying diameter by a tool, comprising, in combination, first and second supports for supporting the tool and the blank, respectively; a drive shaft on said second support for rotating the blank about an axis; drive means for moving one of said first and second supports in an axial direction relative to the respective other support whereby the relative position of said tool and blank continuously varies and the tool engages successive blank portions having different diameters; an epicyclic transmission including a first input member driven by said drive means, an output member connected with said drive shaft, and a second input member; and a control device having an output means connected with said second input member, and including control means driven from said drive means and varying the speed of said output means so that the speed of said second input member and of said output member are varied in accordance with the continuous variation of the relative position of said blank and said tool for obtaining substantially the same peripheral speed at the portion of said varying diameter engaged by said tool.

2. Apparatus as claimed in claim 1 wherein said control means includes a rotary first control member driven from said drive means at constant speed and a second control member driven by said first control member at a speed cyclically varying during each revolution of said first control member; and wherein said second control member is connected with said output means for cyclically varying the speed of the same.

3. Apparatus as claimed in claim 2 wherein the blank is conical and has a thin end and a thick end; wherein said first and second supports have two relative positions in which the tool engages the thin and thick ends of the blank, respectively; wherein said second control member gradually increases the rotary speed of the blank during the first half revolution of said first control member, and gradually decreases said rotary speed of said blank during the second half revolution of said first control member; and wherein the relative movement between said tool and said blank has such a direction that the tool first engages the thin end of the blank and last engages the thick end of the blank.

4. Apparatus as claimed in claim 3 wherein said first rotary member is a cam; and wherein said second control member includes a cam follower cooperating with said cam; said control device including means for transforming the motion of said cam follower into a rotary motion of said output means.

5. Apparatus as claimed in claim 1 wherein said epicyclic transmission is a differential transmission; wherein said first input member includes a planetary carrier and a carrier gear around the same; wherein said drive means drives said carrier gear and said carrier; wherein said transmission includes planetary gears mounted on said carrier; wherein said output member includes a first sun gear meshing with said planetary gears; and wherein said second input member is a second sun gear meshing with said planetary gears.

6. Apparatus as claimed in claim 1 wherein said control means is driven from said drive means at a constant speed; and wherein said control device includes means connecting said control means with said output means for varying the speed of the latter.

7. Apparatus as claimed in claim 1 wherein said control means include a rotary cam driven from said drive means at uniform speed, a rack bar having a cam follower portion engaging said cam, and a pinion meshing with said rack bar and connected with said output means for rotation.

8. Apparatus as claimed in claim 7 wherein said cam has an oval elongated peripheral cam track engaged by said cam follower portion; wherein said cam track is symmetrical to a longitudinal plane of symmetry; and wherein said control device includes a cam shaft supporting said cam for rotation about an axis located in said plane of symmetry near one end of said oblong cam track so that said rack bar moves in one direction during the first half revolution of said cam, and in the opposite direction during the second half revolution of said cam whereby the rotary speed of said blank is increased during one half revolution and decreased during the other half revolution.

9. Apparatus as claimed in claim 7 wherein said drive means is rotatable in one direction for moving said one support in a working direction, and in an opposite direction for rapidly moving said one support in a return direction; and wherein said control device includes means for rapidly moving said rack bar and cam follower away from said cam before the direction of rotation is reversed so that the direction of rotation can be reversed by said drive means without engagement of said cam follower by said cam.

* * * * *